(12) United States Patent
Carlozzi

(10) Patent No.: US 10,862,745 B2
(45) Date of Patent: Dec. 8, 2020

(54) INTERFACE FOR CREATING A PLAN ARTIFACT

(71) Applicant: Hewlett-Packard Development Company, L.P., Houston, TX (US)

(72) Inventor: Christopher Michael Carlozzi, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 686 days.

(21) Appl. No.: 14/759,704

(22) PCT Filed: Feb. 28, 2013

(86) PCT No.: PCT/US2013/028442
§ 371 (c)(1),
(2) Date: Jul. 8, 2015

(87) PCT Pub. No.: WO2014/133533
PCT Pub. Date: Sep. 4, 2014

(65) Prior Publication Data
US 2015/0350007 A1    Dec. 3, 2015

(51) Int. Cl.
*H04L 12/24* (2006.01)
*G06F 8/34* (2018.01)

(52) U.S. Cl.
CPC .......... *H04L 41/08* (2013.01); *G06F 8/34* (2013.01); *H04L 41/22* (2013.01)

(58) Field of Classification Search
CPC ......... G06F 3/0481; G06F 8/34; H04L 41/08; H04L 41/22
See application file for complete search history.

(56) References Cited

U.S. PATENT DOCUMENTS 7,450,505 B2 * 11/2008 Buchanan ........... H04L 12/4641
370/231
7,519,917 B2    4/2009 Lewis-Bowen et al.
(Continued)

FOREIGN PATENT DOCUMENTS

CN    102566916    7/2012
CN    102591644    7/2012
(Continued)

OTHER PUBLICATIONS

Boomi, Inc., "Connect Once, Integrate Everywhere," (Web Page), Copyright 2013, 3 pages, available at http://www.boomi.com/solutions.
(Continued)

*Primary Examiner* — Matthew Ell

(57) ABSTRACT

Embodiments are the creating of a plan artifact. A location, with respect to a virtual canvas, of each of a plurality of user interactions is identified. A plurality of noes are caused to be displayed on the virtual canvas wherein each node is displayed at a position corresponding to a location of one of the plurality of user interactions. Links between selected pairs of the displayed nodes are identified based on at least one of a user defined virtual canvas path and relative proximities between the displayed nodes. A connection is caused to be displayed between each pair of nodes identified as linked. A plan artifact defined at least in part by the displayed nodes and identified links is created.

20 Claims, 11 Drawing Sheets

(56) References Cited

U.S. PATENT DOCUMENTS

| | | |
|---|---|---|
| 2004/0060037 A1 | 3/2004 | Damm et al. |
| 2010/0074141 A1* | 3/2010 | Nguyen ................ H04L 41/12 370/254 |
| 2010/0094598 A1 | 4/2010 | Okada et al. |
| 2011/0138047 A1 | 6/2011 | Brown et al. |
| 2012/0131460 A1* | 5/2012 | Coyle-Gilchrist ... G11B 27/034 715/716 |
| 2012/0203908 A1 | 8/2012 | Beaty et al. |
| 2012/0204169 A1 | 8/2012 | Breiter et al. |
| 2012/0209506 A1 | 8/2012 | Tamayama et al. |
| 2012/0215919 A1 | 8/2012 | Labat et al. |
| 2012/0254791 A1* | 10/2012 | Jackson ............. G06F 3/04815 715/781 |
| 2013/0016126 A1 | 1/2013 | Wang et al. |

FOREIGN PATENT DOCUMENTS

| | | |
|---|---|---|
| CN | 105009055 | 10/2015 |
| EP | 1679857 A1 | 7/2006 |
| WO | WO-0154350 A2 | 7/2001 |
| WO | WO-0175568 A1 | 10/2001 |

OTHER PUBLICATIONS

International Search Report & Written Opinion received in PCT Application No. PCT/US2013/028442, dated Nov. 25, 2013, 10 pages.

Valant, C., "ITIL and Cloud Series: Service Design for Cloud Implementation," (Web Page), Jan. 3, 2012, 4 pages, available at http://thoughtsoncloud.com/index/php/2012/01/itil-and-cloud-series-service-design-for-cloud-implementation/.

Extended European Search Report dated Sep. 13, 2016; EP Application No. 13876692.6; Pages 6.

U.S. Appl. No. 14/761,550, Non-Final Rejection dated Sep. 15, 2017. pp. 1-12 and attachments.

* cited by examiner

INTERFACE FOR CREATING A PLAN ARTIFACT

BACKGROUND

A design plan can define a set of disparate objects and relationships or links between select object pairs. In an IT (Information technology environment) a design plan can represent various types of topologies, workflows, and architectures. Defining a design plan for use an IT environment can be a complex experience that includes linking a variety of disparate objects with nested functionalities and configurations into one working model. With object being provided for varying sources and varying types of links needing to be defined between those objects, the process can require multiple of tools and variety of file manipulations.

DRAWINGS

DETAILED DESCRIPTION

Introduction

Figure 1:
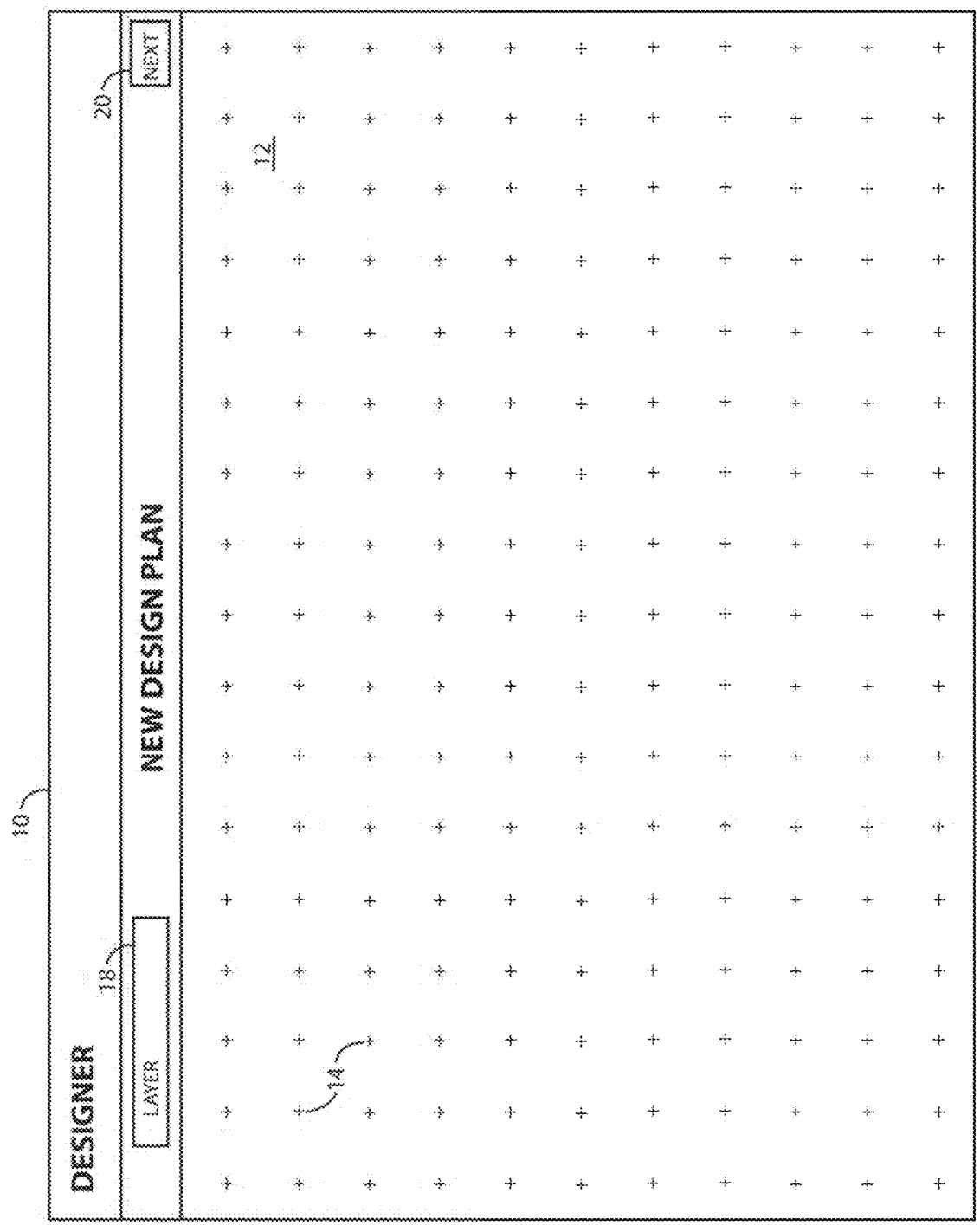
FIGS. 1-9 are example screen views of an example user interface for defining a design plan.

A design plan represents a system of components interconnected in such a way to achieve a desired result. In an IT (Information Technology) environment, a design plan can represent a various types of topologies, workflows, and architectures. An example design plan may represent a cloud architecture where the components can include infrastructure components such as servers, storage, and networking; platform components that sit on the infrastructure; application components that rely on the platform to execute; and service components that utilize application components to produce a desired function. In another example, a design plan can represent a topology of services, network elements, or other objects. For a workflow, each component can represent a step in a process. Each such component can be represented by an object. An object is electronic data that that identifies a given component, specifies default parameters for the component, and identifies that component's connection compatibilities. The compatibilities define a component or a component type that the represented component can or is allowed to connect to within a design plan.

A design plan can be defined through the creation of an artifact, referred to herein as a plan artifact. A plan artifact is electronic data representing a design plan. In some embodiments, the plan artifact is configured to be electronically processed to automatically instantiate that design plan. The artifact, for example, may take any number of electronic forms including, but not limited to, data files, documents, scripts and executable modules. Where for example, a design plan represents a service topology, the plan artifact may be electronic data specifying the defined topology in a format compatible with a standard such as TOSCA (Topology and Orchestration Specification for Cloud Applications). Continuing with the cloud architecture example, a plan artifact may represent an infrastructure layer, a platform layer, an application layer, a service layer, or any combination thereof.

Various embodiments described below were developed for use in defining design plans. Embodiments allow users to interact with a virtual canvas to select a variety of nodes each representing a generalized plan object. The interaction opens an object-oriented interface menu allowing the user to select desired nodes and their placement on the virtual canvas. Interacting with the virtual canvas, users are able to select and modify modify parameters of the represented plan objects.

Further interactions link pairs of nodes which in turn define connections between corresponding pairs of plan objects. The decision as to which nodes are linked can be automated based on connection compatibilities of each represented plan object and the relative positioning of the nodes on the virtual canvas. Nodes positioned adjacent to one another may be linked automatically so long as connecting the corresponding plan objects does not violate their connection compatibilities. The links can also be defined or modified based on a virtual canvas path defined by the user. For example, the user can swipe a path on the canvas that passes through a set of nodes. That set of nodes will be linked so long as connecting the corresponding plan objects does not violate a connection compatibility.

Links between each node are displayed visually on the virtual canvas as connections. Each visual connection represents a link between corresponding plan objects. That link may be defined, at least in part, by one or more default parameters. Interacting with a given connection, a user is able to modify those parameters. With the nodes, links and various parameters identified, the plan artifact can be created, modified, and saved. The plan artifact can be used and reused to instantiate a defined design plan.

The following description is broken into sections. The first, labeled "Illustrative Examples," presents example screen views of a user interface used being used to define a design plan and create a corresponding plan artifact. The second section, labeled "Components," describes examples of various physical and logical components for implementing various embodiments. The third section, labeled as "Operation," describes steps taken to implement various embodiments.

Illustrative Example

FIG. 1 depicts a screen view of graphical user interface (GUI) 10 for use in creating a design plan artifact. GUI 10 includes virtual canvas 12 which represents a surface for positioning user selected nodes representing various plan objects. In this example, virtual canvas 12 is shown to include grid 14 for use in aligning those nodes. Where a design plan includes a number of layers, control 18 is used to select a current layer. Control 20 is used to move to a next step in the design process.

Figure 2:
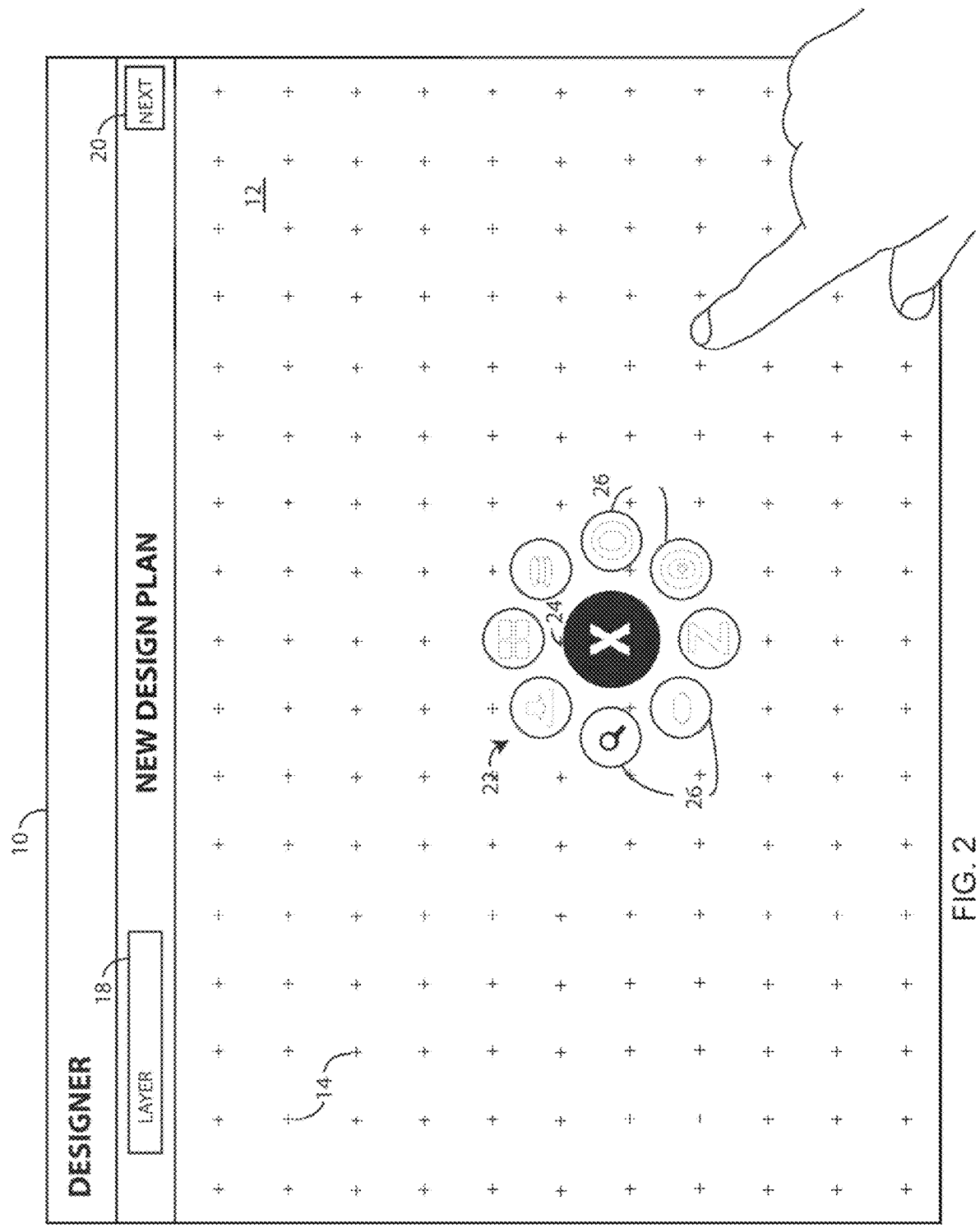

Moving to FIG. 2, a user has interacted with virtual canvas 12 causing the display of control 22. Control 22 in this example is a pinwheel control defined by a center point 24 surrounded by a plurality of node buttons 26. Each node button 26 represents an available node or a set of available nodes. A user interacts with a selected node button to select a desired node that will be placed on virtual canvas 12 positioned at center point 24. In this example, the user interacted with virtual canvas by tapping the screen on which GUI 10 is displayed. In another example, the user may use an input device such as a mouse to click on the virtual canvas. In response to that interaction, control 22 appears with center point 24 positioned at or near the location of interaction with virtual canvas 12. In this fashion, the user selects the position for placing a selected node.

Figure 3:
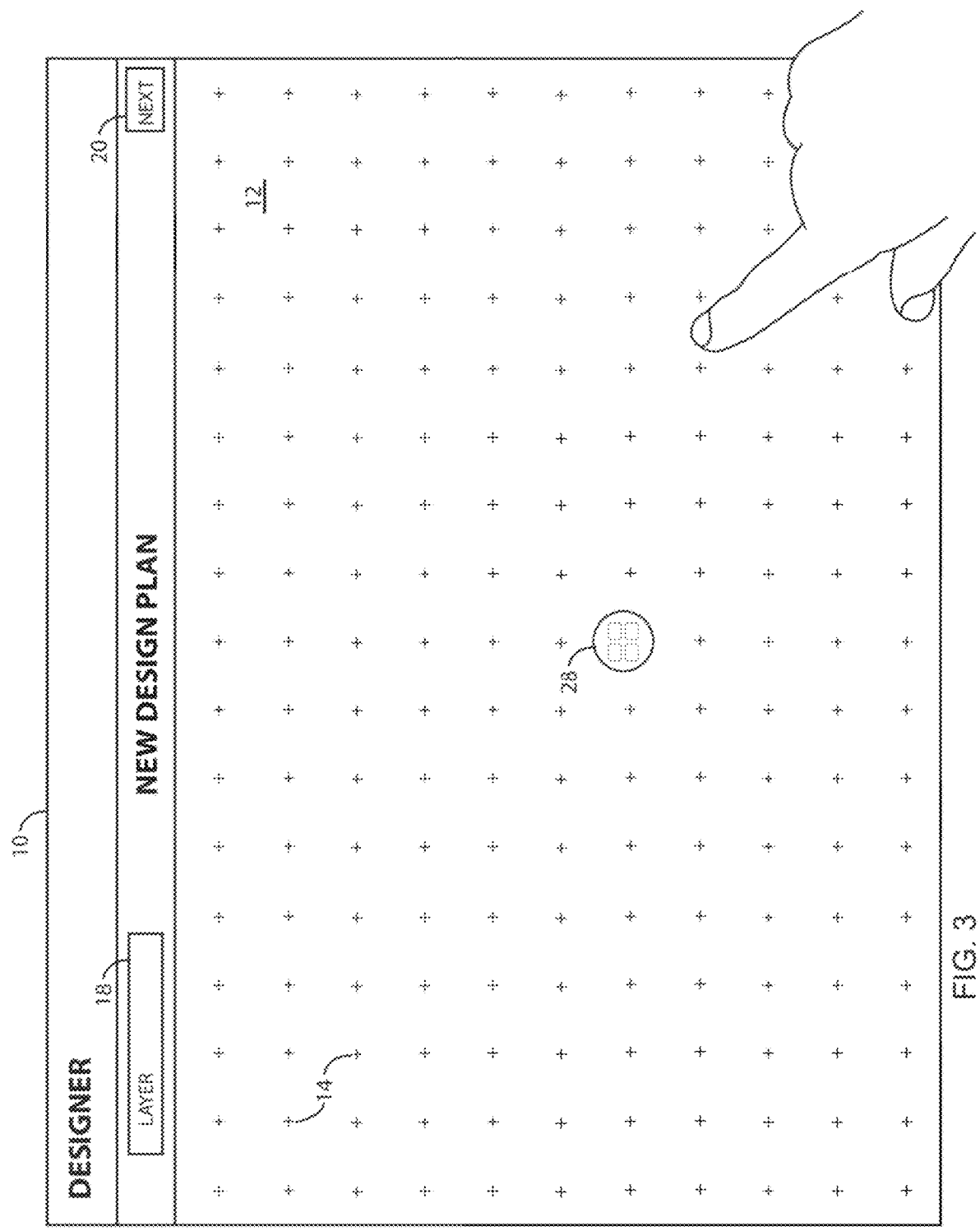
Figure 4:
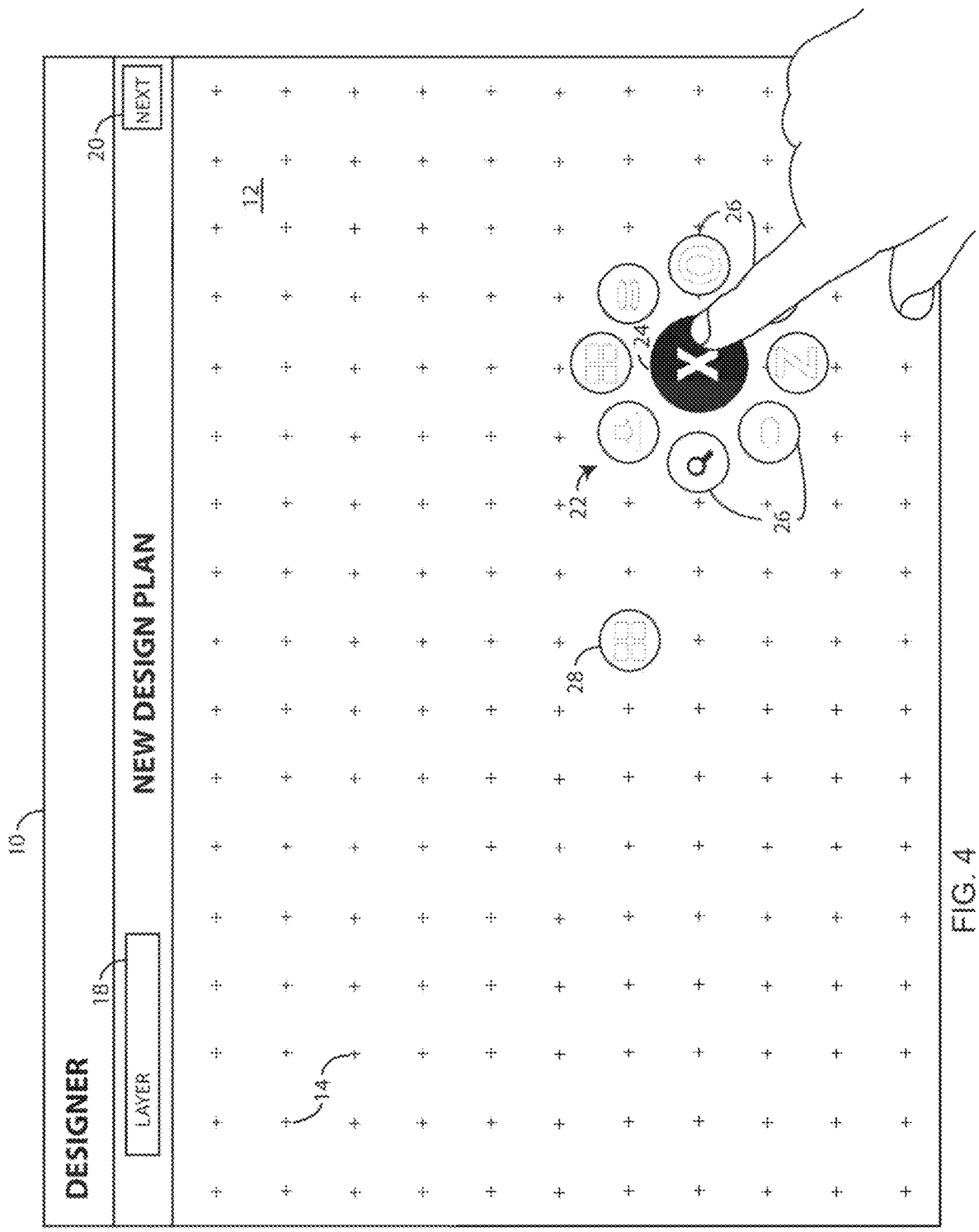
Figure 5:
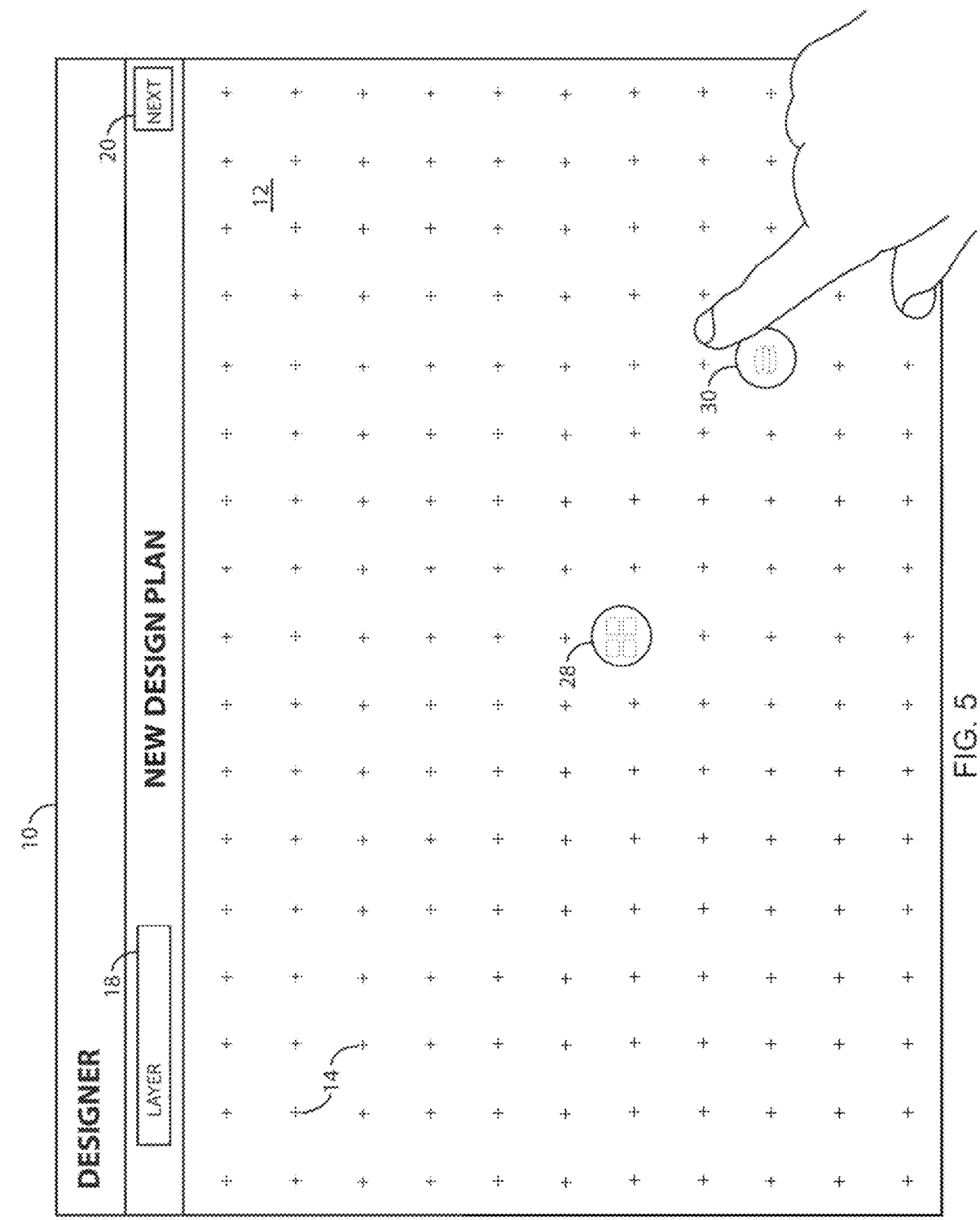

Looking at FIG. 3, a user has selected node 28 by interacting with a corresponding node button 26 shown in FIG. 2. Node 28 is positioned such that it effectively replaces center point 24 of control 22 and is positioned at a location corresponding to the user's interaction with virtual canvas 12. In FIG. 4, the user again taps the screen displaying GUI 10 causing control 22 to reappear with center point 24 positioned at a position on virtual canvas 12 corresponding to the tap. Here, the user can again interact with a selected node button 26 to select a second node for use in defining the design plan. In FIG. 5, that node is node 30.

Figure 6:
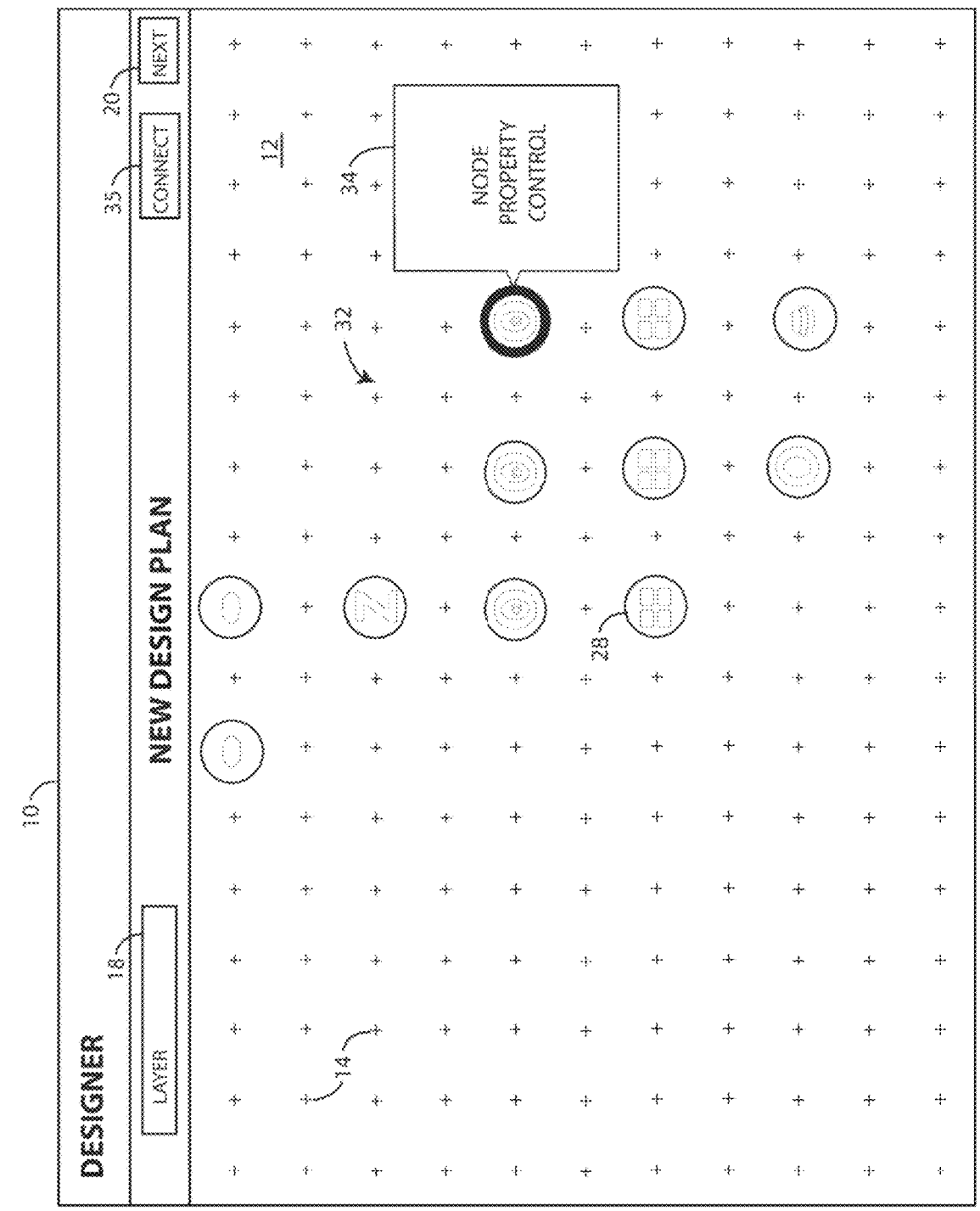

In FIG. 6, virtual canvas 12 has been populated with a plurality of selected nodes 32 positioned according to a user's repeated interactions with virtual canvas 12. Each of the plurality of selected nodes 32, as mentioned, represents a corresponding plan object. In this example, each of the plurality of selected nodes 32 may be individually selected by a user allowing the user to select or otherwise modify one or more parameters for a plan object represented by that node. Here a user has selected a given node causing the display of control 34 through which the user can specify parameters for the represented object. Assuming, for the moment, that a desired number of nodes have been selected, the user can select control 35 which, in this example, causes links to be automatically established between the plurality of selected nodes 32.

Figure 7:
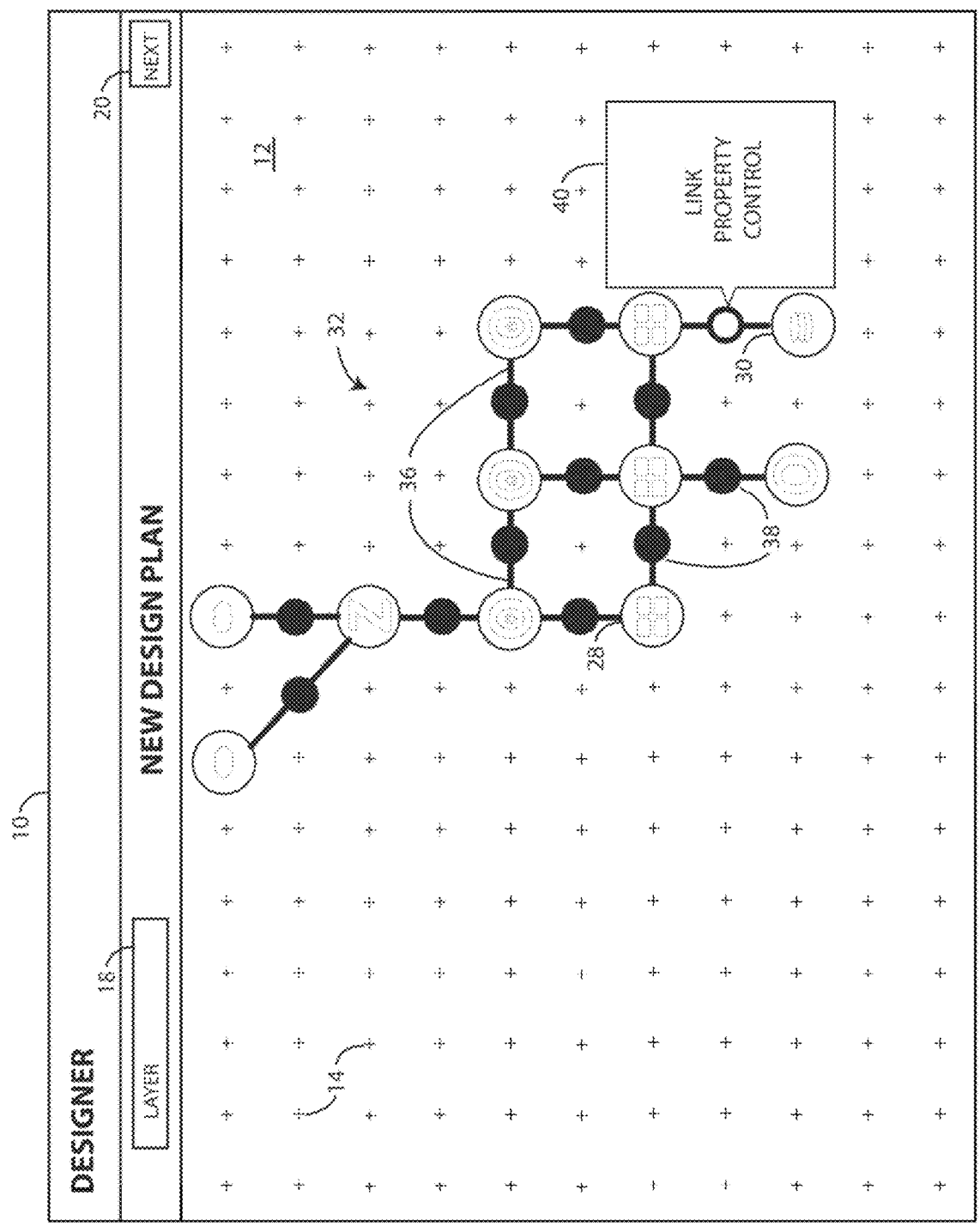

The established links are visually depicted as connections 36 in FIG. 7. Each connection 36 between a given pair of nodes represents a link between a corresponding pair of plan objects. In this example, the links are automatically generated based on connection compatibilities of the plan objects represented by the plurality of selected nodes 32 and the relative positions of the plurality of selected nodes 32 on virtual canvas 12. Here, adjacent nodes, as positioned on grid 14, are linked so long as the connection capabilities of the underlying plan objects are not violated. Each connection 36 includes a control 38 with which a user can interact. Interaction with a given control 38 causes the display of a link property control 40 through which the user can specify parameters for a link represented by the corresponding connection 36.

Figure 8:
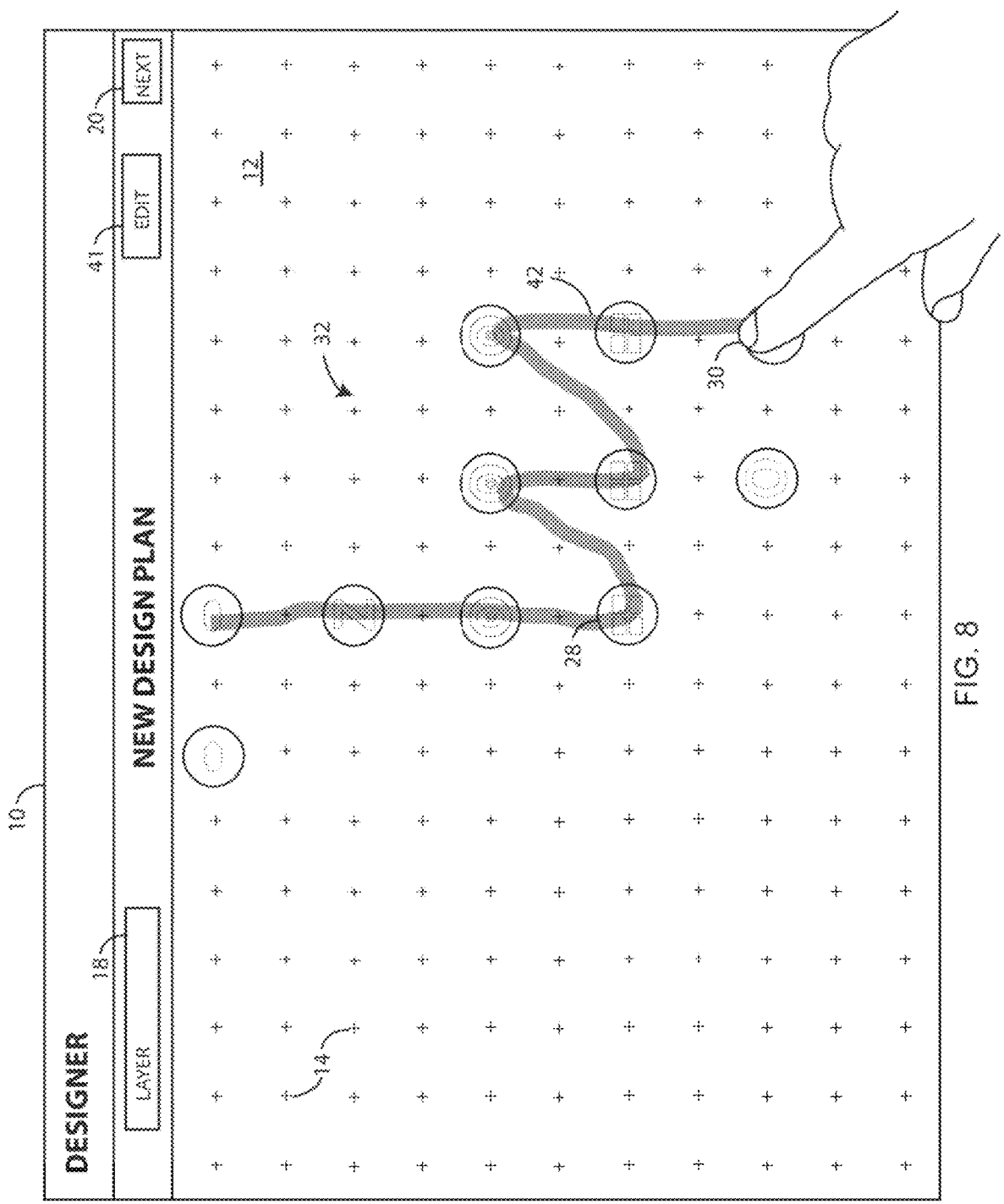

Moving to FIG. 8, the automatically selected links of FIG. 7 may not reflect the links desired by the user. In FIG. 8, the user has selected edit control 41 and swiped a path 42 across virtual canvas 12. The virtual canvas path 42 passes through a user selected set of the plurality of nodes in a desired order. Based on that order and the connection compatibilities of the underlying plan objects, links are created between that set of nodes as depicted visually by connections 44 in FIG. 9.

Figure 9:
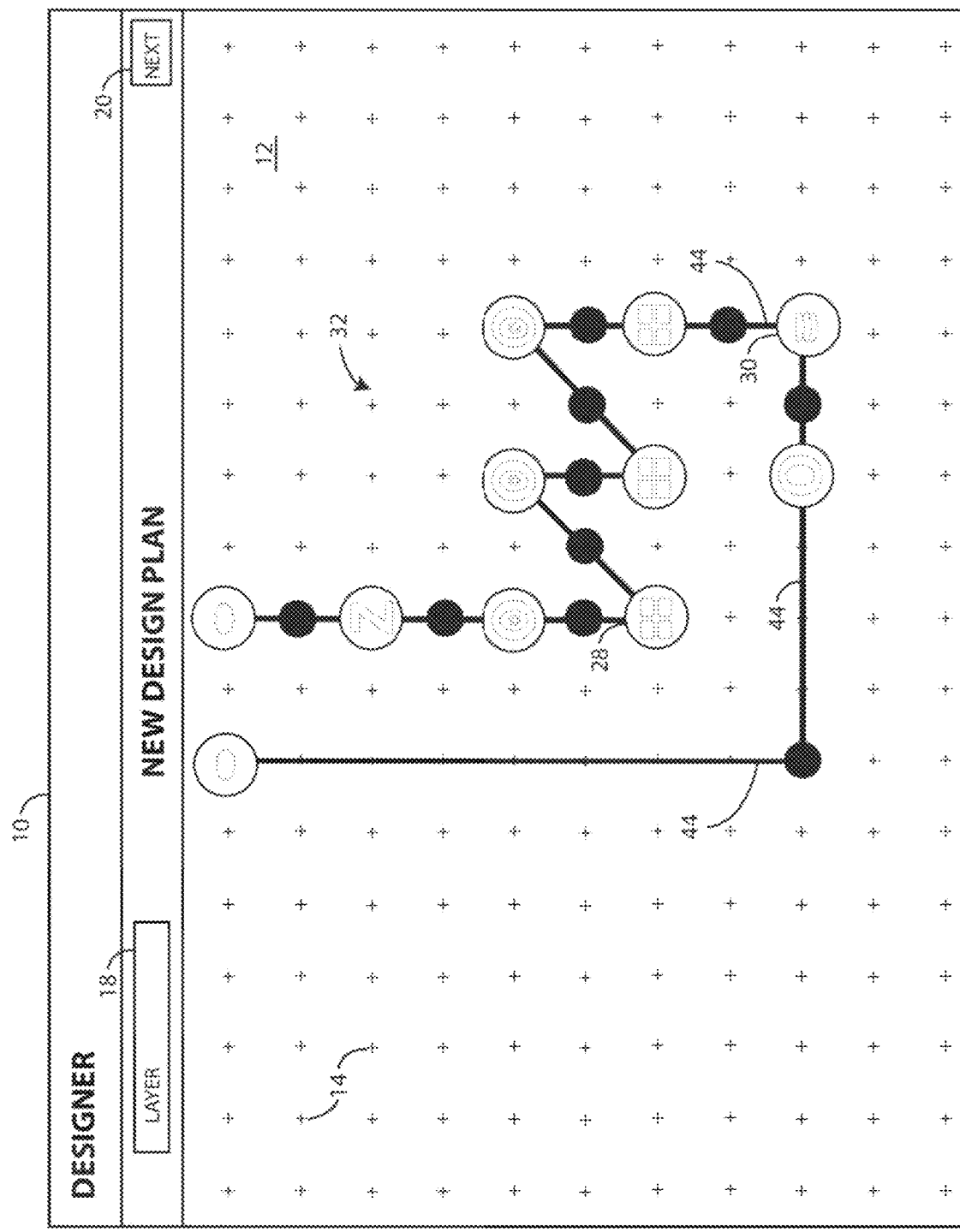

Referring to FIG. 9, with the desired nodes and links placed on virtual canvas 12 and any desired node and link parameters set, the user can select control 20 to save a plan artifact defining the underlying plan objects, links, and corresponding user selected parameters. Where for example the plan artifact represents a cloud architecture, the artifact may be used and reused to instantiate that cloud architecture using the components represented by the plan objects and connections represented by the various links between the user selected nodes 32.

Figure 10:
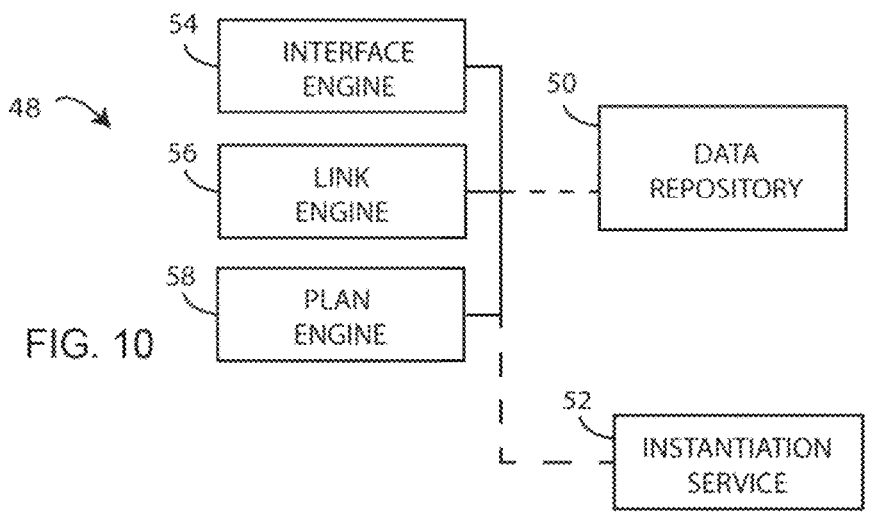
FIG. 10 depicts a system according to an example.
Figure 11:
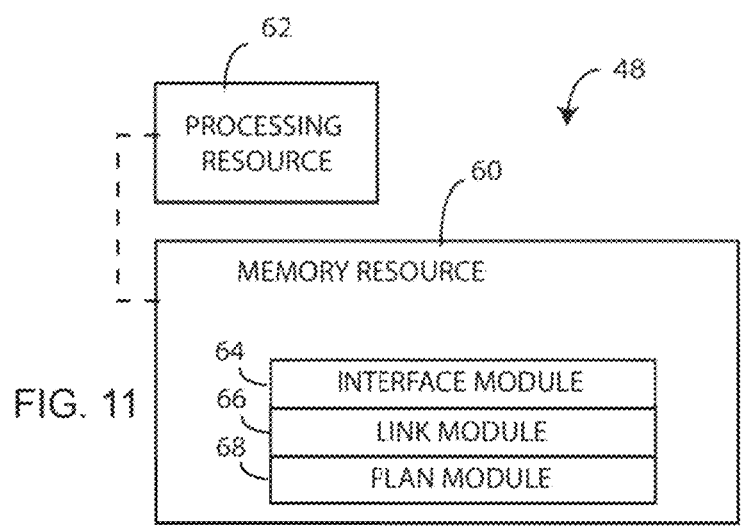
FIG. 11 is a block diagram depicting a memory resource and a processing resource according to an example.

Components:

FIGS. 10 and 11 depict examples of physical and logical components for implementing various embodiments. In FIG. 10 various components are identified as engines 54-58. In describing engines 54-58, focus is on each engine's designated function. However, the term engine, as used herein, refers to a combination of hardware and programming configured to perform a designated function. As is illustrated later with respect to FIG. 11, the hardware of each engine, for example, may include a processor and a memory, while the programming is code stored on that memory and executable by the processor to perform the designated function. In another example, the hardware may be the memory used to store the code.

FIG. 10 depicts a system 48 for creating a plan artifact. System 48 is shown as being in communication with data repository 50 and instantiation service 52. Data repository 50 represents generally any memory for storing electronic data. Instantiation service 52 represents generally any combination of hardware and programming configured to process a plan artifact to instantiate the artifact's corresponding design plan.

System 48 includes interface engine 54, link engine 56, and plan engine 58. Interface engine 54 is configured to cause a display of a virtual canvas and a control for selecting from among a plurality of available nodes. The nodes may be nodes available to a particular user as defined by data in repository 50. In the example of FIGS. 1-9, virtual canvas 12 and control 22 are examples of a virtual canvas and control caused to be displayed by engine 54. In response to a user interaction with the control, interface engine 54 is responsible for causing a display of a plurality of user selected nodes positioned on the virtual canvas according to the user's interaction with the control. Plurality of selected nodes 32 depicted in FIG. 6-9 are an example.

Interface engine 54 may cause the display of the control upon detection of a user interaction with the virtual canvas at a particular location. For example, the user may touch the display at the location or, if using a mouse, click at that location. The control, in one example, is a pinwheel control having a plurality of node buttons positioned according to the location touched or clicked. That location may, but need not, be a center point for the pin wheel control. The node buttons are for selecting from among the plurality of available nodes. Interface engine 54 is configured to cause a selected one of the plurality of nodes to be displayed at the center point according to a user interaction with one of the plurality of node buttons. Thus, after a number of iterations in which the user interacts with the virtual canvas causing the control to be displayed at various positions on that canvas, interface engine 54 causes the display of the plurality of the nodes selected by the user when interacting with the control at each position. Interface engine 54 is also responsible for causing a display of a connection between each pair of nodes identified by link engine 56 as discussed below.

Link engine 56 is configured to identify links between selected pairs of the displayed nodes based on at least one of a user defined virtual canvas path and relative proximities between the displayed nodes. In performing its function, link engine 56 may generate link data defining the links. The link data may be stored in repository 50 for use by interface engine 50 when causing a display of connections corresponding to the identified links. A virtual canvas path is a path over the virtual canvas that passes through two or more of the displayed nodes in a given order. Interface engine 54 may be responsible for identifying a user interaction with the virtual canvas that defines the virtual canvas path. For example, the user may swipe or click a path that passes through those nodes. Interface engine 54 may then identify the path as an ordered sequence of nodes such that the links between plan objects may be defined by ink engine 56 at least in part by that sequence. FIGS. 8 and 9 illustrate an example Link engine 56 may also be configured to examine plan objects associated the plurality of nodes to identify connection compatibilities between the plan objects. The plan objects may be stored in or otherwise identified by data stored in repository 50. For example each available node identified in repository 50 may also identify its corresponding plan object. In one example, each plan object defines its own connection compatibility, that is, it defines one or more plan objects or object types with which it can link. Linking a plan object to another object that is not identified would, in this example, violate the connection compatibility of the given object. In this example, link engine 56 may identify links between selected pairs of the displayed nodes based on the identified connection compatibilities and at least one of a user defined virtual canvas path and relative proximities between the displayed nodes.

Plan engine 58 is configured to create a plan artifact specifying links identified by link engine 56 and objects represented by the displayed nodes. Each node and connection caused to be displayed by interface engine 54 may function as a control that when selected allows a user to select parameters. Selecting a given node allows a user to select or otherwise modify node parameters. In an example, the node parameters are for configuring or otherwise defining an object represented by that node. Selecting a given connection allows a user to select or otherwise modify link parameters. The link parameters are for configuring or otherwise defining a link represented by the selected connection. In this example, plan engine 58 is configured to create a plan artifact specifying links identified by link engine 56, objects represented by the displayed nodes, and any link or node parameters.

Plan engine 58 may save the artifact in repository 50. Instantiation service 52 may then process that artifact to instantiate the defined design plan. Where the defined design plan is a cloud architecture, instantiation service 52 may be a cloud controller or other service capable is instantiating a cloud architecture using the artifact. Thus, each plan object represented by a displayed node in turn may represent at least one of an infrastructure element, a platform element, an application element, and a service element. The plan artifact is then configured to be processed to automatically instantiate at least one of an infrastructure component, platform component, application component, and service component.

In foregoing discussion, engines 54-58 were described as combinations of hardware and programming. Engines 54-58 may be implemented in a number of fashions. Looking at FIG. 11, the programming may be processor executable instructions stored on tangible memory resource 60 and the hardware may include processing resource 62 for executing those instructions. Thus memory resource 60 can be said to store program instructions that when executed by processing resource 62 implement system 48 of FIG. 10.

Memory resource 60 represents generally any number of memory components capable of storing instructions that can be executed by processing resource 62. Memory resource 60 is non-transitory in the sense that it does not encompass a transitory signal but instead is made up of more or more memory components configured to store the relevant instructions. Memory resource 60 may be implemented in a single device or distributed across devices. Likewise, processing resource 62 represents any number of processors capable of executing instructions stored by memory resource 60. Processing resource 62 may be integrated in a single device or distributed across devices. Further, memory resource 60 may be fully or partially integrated in the same device as processing resource 62, or it may be separate but accessible to that device and processing resource 62.

In one example, the program instructions can be part of an installation package that when installed can be executed by processing resource 62 to implement system 48. In this case, memory resource 60 may be a portable medium such as a CD, DVD, or flash drive or a memory maintained by a server from which the installation package can be downloaded and installed. In another example, the program instructions may be part of an application or applications already installed. Here, memory resource 60 can include integrated memory such as a hard drive, solid state drive, or the like.

In FIG. 11, the executable program instructions stored in memory resource 60 are depicted as interface module 64, link module 66, and plan module 68. Interface module 64 represents program instructions that when executed cause processing resource 62 to implement interface engine 54 of FIG. 10. Link module 66 represents program instructions that when executed cause the implementation of link engine 56. Likewise, plan module 68 represents program instructions that when executed cause the implementation of plan engine 58.

Figure 12:
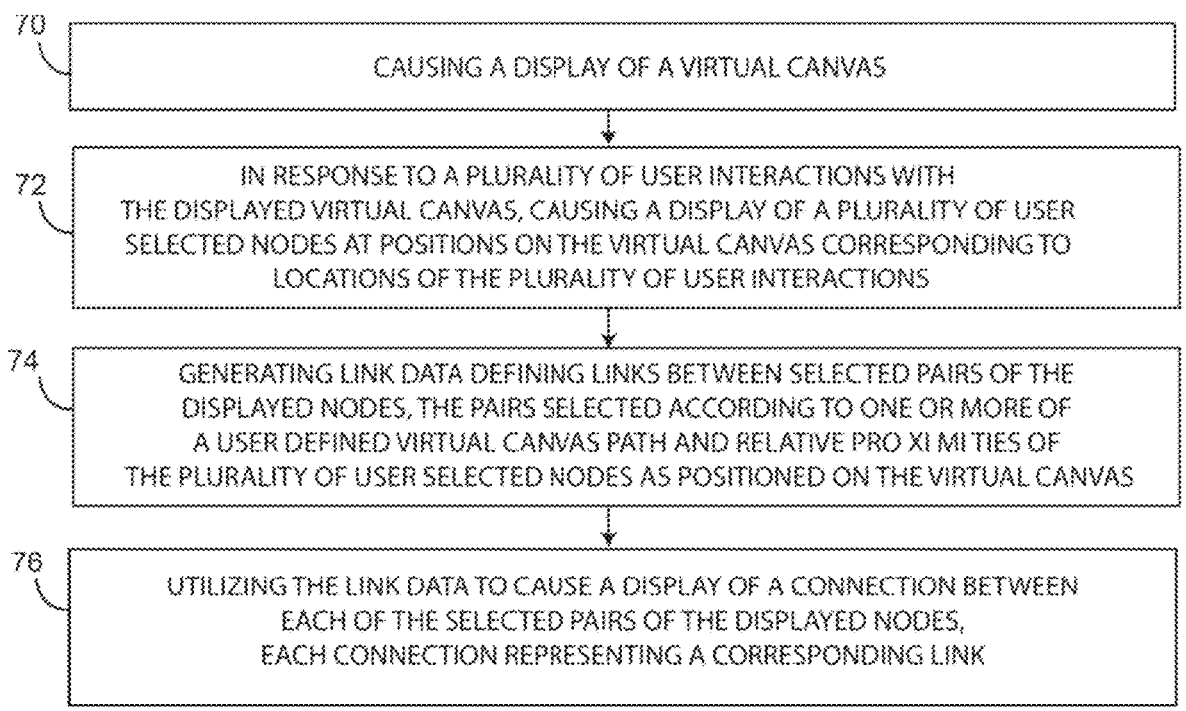
FIG. 12 is a flow diagram depicting steps taken to implement an example.

Operation:

FIG. 12 is a flow diagram of steps taken to implement a method for creating a plan artifact. In discussing FIG. 12, reference may be made to the screen views of FIGS. 1-9 and the components depicted in FIGS. 10 and 11. Such reference is made to provide contextual examples and not to limit the manner in which the method depicted by FIG. 12 may be implemented.

Referring to FIG. 12, a virtual canvas is caused to be displayed (step 70). In response to a plurality of user interactions with the displayed virtual canvas, a plurality of user selected nodes are caused to be displayed at positions on the virtual canvas corresponding to locations of the plurality of user interactions (step 72). Interface engine 54 of FIG. 10 may be responsible for implementing steps 70 and 72. Virtual canvas 12 of FIG. 1 is an example of a virtual canvas caused to be displayed in step 70. Nodes 32 of FIGS. 6-9 are examples of the plurality of nodes caused to be displayed in step 72.

Link data defining links between selected pairs of the displayed nodes is generated (step 74). The pairs are selected according to one or more of a user defined virtual canvas path and relative proximities of the plurality of user selected nodes as positioned on the virtual canvas. As noted, the displayed nodes can represent plan objects of varying types. Step 74 may also include examining the varying objects or object types to identify connection compatibilities between the represented objects. Referring to FIG. 10, link engine 56 may be responsible for implementing step 74. Link engine 56 may identify the connection compatibilities by examining data in repository 50 defining those objects and object types represented by the displayed nodes. Thus, the link data defining links between the selected pairs of displayed nodes may be generated based on the identified link compatibilities and one or more of a user defined virtual canvas path and relative proximities of the plurality of user selected nodes as positioned on the virtual canvas.

The link data is used to cause a display of a connection between each of the selected pairs of the displayed nodes with each connection representing a corresponding link (step 76). Referring to FIG. 10, interface engine 52 may be responsible for implementing step 76. Connections 36 and 44 in FIGS. 7 and 9 serve as example of connections caused to be displayed in step 76.

Step 72, in an example, can include, for each of the plurality of user interactions with the virtual canvas, causing a display of a pin wheel interface control having a plurality of node buttons positioned around a corresponding center point having a position on the virtual canvas selected by the user. Causing a display of the plurality of user selected nodes can then include, for each corresponding center point, causing a display of a corresponding node at that center point. The corresponding node is selected according to a user's interaction with one of the node buttons positioned around that center point.

Each displayed node may functions as a control that when selected allows a user to select a parameter for an object represented by that node. Each displayed connection may function as a control that when selected allows a user to select a parameter for a link represented by that connection. The method depicted in FIG. 12 may also include creating a plan artifact defining the objects represented by the displayed nodes, the links represented by the displayed connections, and corresponding parameters selected by the user. Referring to FIG. 10, plan engine 58 may be responsible for doing so.

CONCLUSION

FIGS. 1-9 depict a user interface used to define a design plan. That user interface is an example only. FIGS. 10-11 aid in depicting the architecture, functionality, and operation of various embodiments. In particular, FIGS. 10 and 11 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 12 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A non-transitory storage medium storing instructions that when executed cause a system to:
    identify, with respect to a virtual canvas displayed in a graphical user interface (GUI), a location of each of a plurality of user interactions;
    cause a display of a plurality of nodes on the virtual canvas, wherein each respective node of the plurality of nodes is displayed at a position corresponding to a location of a respective user interaction of the plurality of user interactions;
    determine relative proximities between the displayed plurality of nodes as positioned on the virtual canvas displayed in the GUI;
    identify links between pairs of the displayed plurality of nodes based on the determined relative proximities between the displayed plurality of nodes as positioned on the virtual canvas displayed in the GUI;
    cause a display of a connection between each pair of the displayed plurality of nodes identified as linked by the links;
    create a plan artifact defined at least in part by the displayed plurality of nodes and based on the links; and
    instantiate an architecture comprising infrastructure components based on the plan artifact.

2. The non-transitory storage medium of claim 1, wherein the instructions when executed cause the system to, for each user interaction of the plurality of user interactions, cause a display of a pinwheel user interface control having a plurality of node buttons positioned around a center point, wherein the center point defines a position for placing a selected node on the virtual canvas, the selected node being a node associated with a user selected one of the node buttons.

3. The non-transitory storage medium of claim 1, wherein:
    the displayed plurality of nodes represent different object types, and
    the instructions when executed cause the system to:
        examine the different object types to identify link compatibilities between the displayed plurality of nodes; and
        identify the links between the pairs of the displayed plurality of nodes based on the identified link compatibilities and the relative proximities between the displayed plurality of nodes, wherein each respective link of the identified links is based on a determination that a connection compatibility between object types represented by displayed nodes interconnected by the respective link is not violated.

4. The non-transitory storage medium of claim 1, wherein:
    each respective node of the displayed plurality of nodes functions as a control that when selected allows a user to modify node parameters associated with the respective node, and each respective connection functions as a control that when selected allows the user to modify links parameters associated with a corresponding link of the respective connection, and the instructions when executed cause the system to create the plan artifact defined by the displayed plurality of nodes, the links, the modified node parameters, and the modified link parameters.

5. The non-transitory storage medium of claim 1, wherein the instructions when executed cause the system to further:

responsive to activation of an edit control in the GUI, receive a user selected path across the virtual canvas that includes the displayed connections, the user selected path passing through a subset of the displayed plurality of nodes; and modify the links among the displayed plurality of nodes in response to the user selected path, wherein the plan artifact is defined further by the modified links.

6. The non-transitory storage medium of claim 5, wherein the user selected path is defined by a user swipe across the virtual canvas based on a user touching a display.

7. The non-transitory storage medium of claim 1, wherein the infrastructure components of the architecture instantiated based on the plan artifact comprise a server and an application.

8. The non-transitory storage medium of claim 1, wherein the plan artifact comprises an executable module.

9. A system comprising:

a processor; and a non-transitory storage medium storing instructions executable on the processor to:

cause a display of a virtual canvas in a graphical user interface (GUI) and a control for selecting from among a plurality of available nodes, and in response to user interactions with the control, cause a display of user selected nodes positioned on the virtual canvas according to the user interactions with the control;

determine relative proximities between the displayed user selected nodes as positioned on the virtual canvas displayed in the GUI;

identify links between pairs of the displayed user selected nodes based on the determined relative proximities between the displayed user selected nodes as positioned on the virtual canvas in the GUI;

cause a display of a connection between each pair of the displayed user selected nodes based on the identified links;

create a plan artifact defined at least in part by the displayed user selected nodes and based on the identified links; and instantiate an architecture comprising infrastructure components based on the plan artifact.

10. The system of claim 9, wherein the instructions are executable on the processor to:

upon user interaction with the virtual canvas at a user selected position, cause a display of the control, the control including a plurality of node buttons positioned in a circular fashion around the user selected position; and cause a selected one of the plurality of available nodes to be displayed at the user selected position according to a user interaction with one of the plurality of node buttons.

11. The system of claim 9, wherein:

each respective displayed user selected node functions as a control that when selected allows a user to select parameters associated with an object represented by the respective displayed user selected node, and each respective connection represents a link that when selected allows a user to select parameters associated with the link represented by the respective connection, and the instructions are executable on the processor to create the plan artifact specifying the identified links, objects represented by the displayed user selected nodes, the parameters associated with the object, and the parameters associated with the link.

12. The system of claim 9, wherein the architecture instantiated based on the plan artifact comprises a cloud architecture.

13. The system of claim 9, wherein the instructions are executable on the processor to further:

responsive to activation of an edit control in the GUI, receive a user selected path across the virtual canvas that includes the displayed connections, the user selected path passing through a subset of the displayed user selected nodes; and modify the links among the displayed user selected nodes in response to the user selected path, wherein the plan artifact is defined further by the modified links.

14. The system of claim 13, wherein the user selected path is defined by a user swipe across the virtual canvas based on a user touching a display.

15. The system of claim 9, wherein the displayed user selected nodes represent objects of different types, and wherein the instructions are executable on the processor to:

examine the objects of the different types to identify link compatibilities between the objects, wherein identifying the links is according to the identified link compatibilities where each respective link of the identified links is based on a determination that a connection compatibility between object types represented by displayed user selected nodes interconnected by the respective link is not violated.

16. A method executed by a system comprising a computer processor, comprising:

causing a display of a virtual canvas in a graphical user interface (GUI);

in response to a plurality of user interactions with the virtual canvas, causing a display of user selected nodes at positions on the virtual canvas corresponding to locations of the plurality of user interactions;

determining relative proximities between the displayed user selected nodes as positioned on the virtual canvas in the GUI;

identifying links between pairs of the displayed user selected nodes, the pairs selected according to the determined relative proximities of the displayed user selected nodes as positioned on the virtual canvas displayed in the GUI;

causing a display of a connection between each of the pairs of the displayed user selected nodes, each connection representing a corresponding link of the links;

responsive to activation of an edit control in the GUI, receiving a user selected path across the virtual canvas that includes the displayed connections, the user selected path passing through a subset of the displayed user selected nodes;

modifying the links among the displayed user selected nodes in response to the user selected path;

creating a plan artifact defined at least in part by the displayed user selected nodes and the modified links; and instantiating an architecture comprising infrastructure components based on the plan artifact.

17. The method of claim 16, wherein the displayed user selected nodes represent objects of different types, the method comprising:
   examining the objects of the different types to identify link compatibilities between the objects,
   wherein identifying the links is according to the identified link compatibilities where each respective link of the identified links is based on a determination that a connection compatibility between object types represented by displayed user selected nodes interconnected by the respective link is not violated.

18. The method of claim 16, wherein for each respective user interaction of the plurality of user interactions with the virtual canvas, the method further comprises:
   causing a display of a pin wheel interface control having a plurality of node buttons positioned around a center point having a position on the virtual canvas corresponding to the respective user interaction; and
   causing a display of a respective user selected node corresponding to a user interaction with a selected one of the plurality of node buttons, the respective user selected node being positioned at the center point.

19. The method of claim 16, wherein:
   each respective displayed user selected node functions as a control that when selected allows a user to select a parameter for an object represented by the respective displayed user selected node, and each respective displayed connection functions as a control that when selected allows a user to select a parameter for a link represented by the respective displayed connection, and
   the method comprises creating the plan artifact defining objects represented by the displayed user selected nodes, the modified links, the parameter for the object, and the parameter for the link.

20. The method of claim 16, wherein the user selected path is defined by a user swipe across the virtual canvas based on a user touching a display.

* * * * *